(12) United States Patent
Sekiguchi et al.

(10) Patent No.: US 10,536,014 B2
(45) Date of Patent: Jan. 14, 2020

(54) CHARGER

(71) Applicant: FDK CORPORATION, Tokyo (JP)

(72) Inventors: Kunihisa Sekiguchi, Tokyo (JP); Yasunari Mizoguchi, Tokyo (JP); Hirohito Teraoka, Tokyo (JP); Hiroshi Suzuki, Tokyo (JP); Katsuki Tsuchiya, Tokyo (JP); Kevin Foster, Tokyo (JP); Jinfeng Jia, Tokyo (JP)

(73) Assignee: FDK CORPORATION, Tokyo (JP)

( * ) Notice: Subject to any disclaimer, the term of this patent is extended or adjusted under 35 U.S.C. 154(b) by 56 days.

(21) Appl. No.: 15/165,927

(22) Filed: May 26, 2016

(65) Prior Publication Data

US 2016/0359353 A1    Dec. 8, 2016

(30) Foreign Application Priority Data

Jun. 5, 2015    (JP) .................................. 2015-114583

(51) Int. Cl.
*H02J 7/00*    (2006.01)
*H02J 7/14*    (2006.01)

(52) U.S. Cl.
CPC .......... *H02J 7/0047* (2013.01); *H02J 7/0052* (2013.01)

(58) Field of Classification Search
USPC ........ 320/107, 108, 114, 115, 116, 134, 135, 320/136
See application file for complete search history.

(56) References Cited

U.S. PATENT DOCUMENTS

| | | | | |
|---|---|---|---|---|
| 8,901,888 B1* | 12/2014 | Beckman | ............ | H01M 2/1022 320/125 |
| 2010/0201322 A1* | 8/2010 | Stanley | .............. | G01R 31/3693 320/134 |
| 2010/0264875 A1* | 10/2010 | Hoffman | ................... | H02J 3/14 320/111 |
| 2012/0126744 A1* | 5/2012 | Kuroda | ................. | H01M 10/44 320/107 |
| 2012/0249084 A1* | 10/2012 | Vilhauer | ............... | H02J 7/0029 320/162 |
| 2013/0076521 A1 | 3/2013 | Hsu | | |
| 2014/0191724 A1* | 7/2014 | Wojcik | ................. | H05K 5/0086 320/114 |
| 2014/0195826 A1* | 7/2014 | Wojcik | ................. | H05K 5/0086 713/300 |
| 2014/0244063 A1* | 8/2014 | Davis | ................. | H05B 37/0272 700/297 |
| 2014/0347000 A1* | 11/2014 | Hamann | ................. | G06F 1/189 320/103 |
| 2014/0368168 A1* | 12/2014 | Beckman | .............. | H02J 7/0021 320/134 |

FOREIGN PATENT DOCUMENTS

| | | |
|---|---|---|
| JP | 2001228939 A | 8/2001 |
| JP | 2014-509829 A | 4/2014 |

* cited by examiner

*Primary Examiner* — Alexis B Pacheco
(74) *Attorney, Agent, or Firm* — Kinney & Lange, P.A.

(57) ABSTRACT

A charger includes: a charging circuit which receives an electric power from external equipment and charges a secondary battery; a control device which determines a power supply capability of the external equipment on the basis of the electric power that is supplied to the charging circuit from the external equipment; and a display device that displays the power supply capability of the external equipment, which has been determined by the control device.

7 Claims, 4 Drawing Sheets

CHARGER

BACKGROUND OF THE INVENTION

Field of the Invention

The present invention relates to a charger for a secondary battery.

Description of the Related Art

A USB (Universal Serial Bus) is widely prevalent as one of the standards of interfaces for connecting peripheral equipment to host equipment such as a PC. In the USB standard, the function has been repeatedly expanded since the appearance thereof, and it has become possible for the USB not only to make the equipment transmit and receive information therebetween but also can supply an electric power for driving peripheral equipment thereto. In addition, in the USB standard, a speed of information transfer and a power supply capability have been continuously enhanced due to the continuous expansion of the standard.

In recent years in which USB-compliant equipment has become prevalent, there also exists equipment which uses a USB port for the purpose of mainly supplying the electric power rather than making the equipment transmit and receive the information therebetween. For instance, a battery of a smart phone is designed so as to be capable of being charged through a USB connection terminal. In addition, a USB charger charges a secondary battery with an electric power which the USB charger has received from an USB port of external equipment.

The above-described USB charger or the like needs to determine a power supply capability in the USB standard, of a connected power supply source, in other words, of the USB port side including a USB cable, when charging the battery through the USB power supply. This is because, for instance, in the case where though the USB charger or the like requires an electric power of 5 volts and 2 amperes, a power supply source in the USB standard can supply only an electric power of 5 volts and 1 ampere, there is a possibility that the voltage of an electric power to be supplied is lowered and the USB charger or the like cannot charge the battery. On the other hand, in the case where the electric power which the USB charger or the like requires is fixed to 5 volts and 1 ampere, for instance, even though the USB standard of both pieces of the equipment correspond to the electric power of 5 volts and 2 amperes, the USB charger results in charging the secondary battery at a lower power supply efficiency than the power supply capability.

As for one example of a charger having a function of determining the power supply capability in the USB port side, a charger is disclosed in Japanese Publication of International Patent Application No. 2014-509829, which has a first circuit that charges the secondary battery and a second circuit that detects the charging current. In this prior art, the charger determines the maximum current value which the USB port side can supply, and charges the secondary battery at the current of the value.

By the way, a time period required for charging the secondary battery largely depends on the power supply capability in the USB port side. For instance, suppose that when the charger charges the secondary battery at 5 volts and 2 amperes as has been previously described, a time period which is spent before the secondary battery is fully charged is approximately 2 and a half hours. When the charger charges the secondary battery at 5 volts and 1 ampere, a time period which is spent before the secondary battery is fully charged becomes approximately 5 hours according to simple calculation. However, in the above-described conventional technology, the secondary battery is only automatically charged at the determined current value which corresponds to the power supply capability in the USB port side. For this reason, in the above-described conventional technology, there is a problem that a user cannot know the power supply capability, and cannot estimate the maximum charging time period required for the charge.

The present invention is designed with respect to such a circumstance, and the object is to provide a charger of which the maximum charging time period for the charge can be estimated by the user.

SUMMARY OF THE INVENTION

An aspect of the present invention is directed to a charger including: a charging circuit which receives an electric power from external equipment and charges a secondary battery; a control device which determines a power supply capability of the external equipment on the basis of the electric power that is supplied to the charging circuit from the external equipment; and a display device that displays the power supply capability of the external equipment, which has been determined by the control device.

The charger receives the electric power from the external equipment and charges the secondary battery; also determines the power supply capability of the external equipment; and further displays the power supply capability on the display device. Thus, a user can know the power supply capability of the external equipment through the display device of the charger. Then, the user can estimate the maximum charging time period required for the charge, on the basis of the power supply capability of the external equipment.

Thereby, the present invention can provide an operation effect of being capable of providing a charger of which the maximum charging time period required for the charge can be estimated by the user.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Embodiments according to the present invention will be described below with reference to the drawings.

First Embodiment of Present Invention

Figure 1:
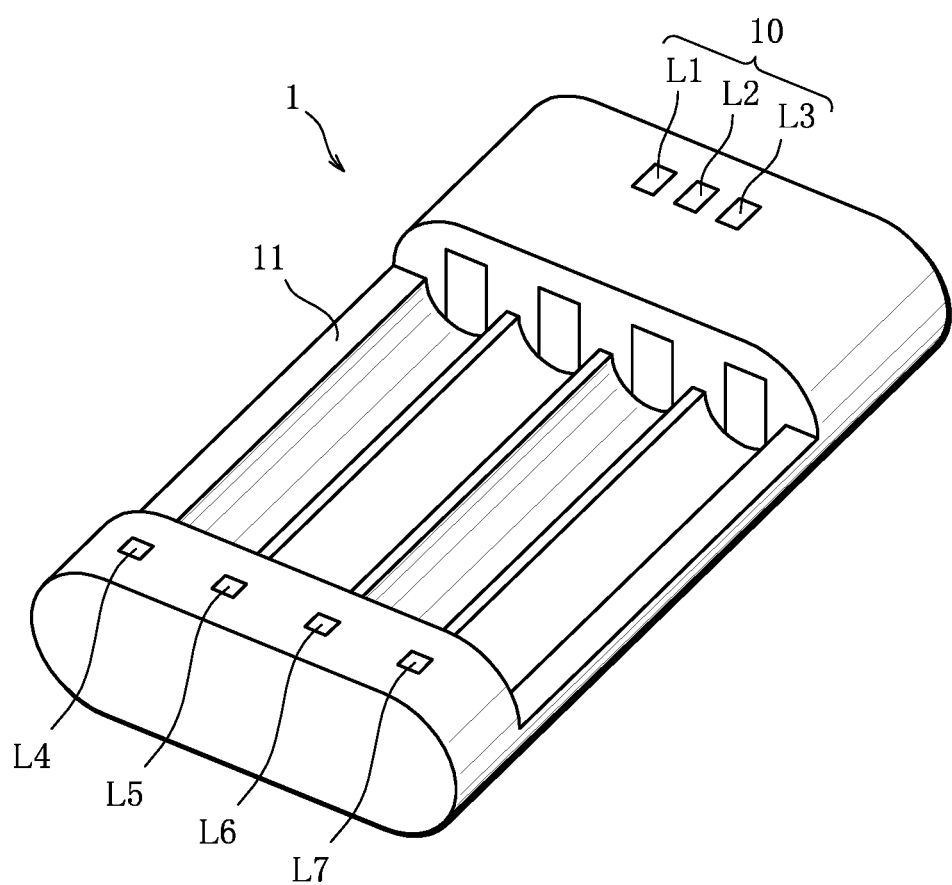
FIG. 1 is a perspective view of a charger according to the present invention.
Figure 2:
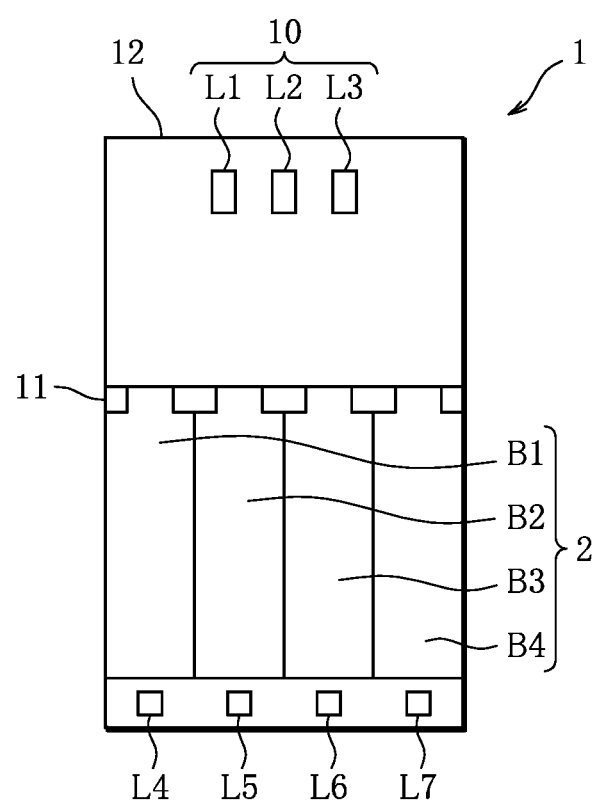
FIG. 2 is a front view of the charger according to the present invention.

FIG. 1 is a perspective view of a charger 1 according to the present invention. In addition, FIG. 2 is a front view of the charger 1 according to the present invention. In addition, FIG. 2 shows a state in which secondary batteries 2 are accommodated in the charger 1.

The charger 1 has a display device 10, a battery supporting unit 11, and full-charge indicating portions L4 to L7. In addition, in an upper part 12 of the charger 1, a Micro-USB connector insertion hole (unillustrated) is provided to which the USB cable can be connected.

The display device 10 includes a plurality of indicating lamps L1 to L3 which are each formed of an LED (light emitting diode). The battery supporting unit 11 has recessed portions formed therein which can store the secondary batteries 2 (secondary batteries B1 to B4) respectively, and supports the secondary batteries B1 to B4 which are accommodated in the respective recessed portions. The full-charge indicating portions L4 to L7 are LEDs which correspond to the respective secondary batteries B1 to B4. The full-charge indicating portions L4 to L7 are, for instance, turned on while the respective secondary batteries B1 to B4 are charged, and are turned off at the time point at which the secondary battery has been charged to a fully charged state and the charging has been completed.

Next, the internal configuration and the operation of the charger 1 will be described.

Figure 3:
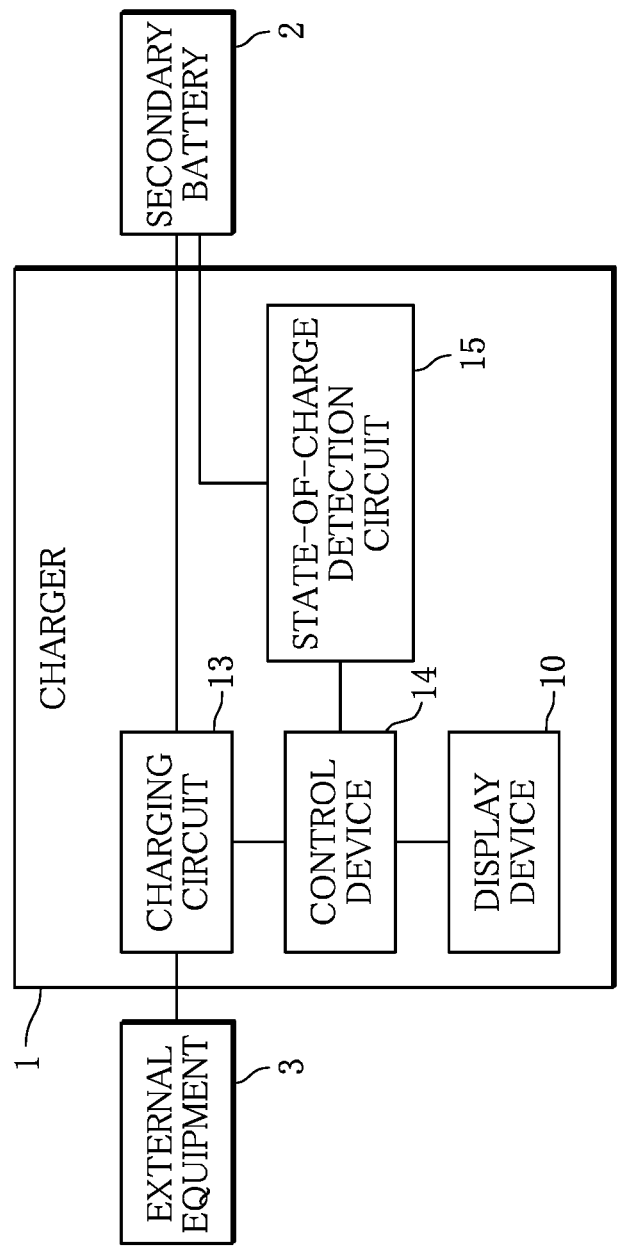
FIG. 3 is a block diagram showing an internal configuration of the charger according to the present invention.

FIG. 3 is a block diagram showing the internal configuration of the charger 1 according to the present invention.

The charger 1 has a charging circuit 13, a control device 14 and a state-of-charge detection circuit 15 provided therein, in addition to the display device 10.

The charging circuit 13 receives an electric power through a USB cable from an external equipment 3, and charges the secondary batteries 2 which are accommodated in the battery supporting unit 11.

The control device 14 is a known microcomputer control circuit, and determines the power supply capability of the external equipment 3, by detecting an electric current and a voltage of an electric power which is supplied to the charging circuit 13 from the external equipment 3. It is preferable that the power supply capability of the external equipment 3 is determined when the external equipment 3 is connected, and in addition, periodically also while the external equipment 3 is connected. Here, it results in being selected in stages which standard the power supply capability through the USB corresponds to, among a plurality of USB standards to which the charger 1 corresponds, as long as the external equipment 3 corresponds to any one of each generation of the USB standards. More specifically, when it is assumed, for instance, that the voltage is 5 volts and the electric current is any one of 0.5 A, 1.0 A and 2.0 A, which are the power supply capability of the external equipment 3, the power supply capability of the external equipment 3 is determined to be any one of three grades of Low, Medium and High, respectively. The control device 14 controls the display device 10 so that the display device 10 displays the determined power supply capability of the external equipment 3 thereon.

The state-of-charge detection circuit 15 is a circuit which detects states of charge of the secondary batteries B1 to B4, and notifies the control device 14 of the completion of charge on condition that all of the secondary batteries B1 to B4 have been fully charged. In the case where the full-charge indicating portions L4 to L7 are not provided in the charger 1, the control device 14 preferably shows that all of the secondary batteries B1 to B4 have been completely charged to the user, for instance, by turning off all of the plurality of indicating lamps L1 to L3 of the display device 10.

Subsequently, a method for making the display device 10 display the power supply capability of the external equipment 3 will be described below.

The display device 10 receives the determination result for the power supply capability of the external equipment 3 from the control device 14, and displays the power supply capability by the three indicating lamps L1 to L3, as will be described below. Here, the power supply capability of the external equipment 3 is any one of the previously described Low, Medium and High.

FIGS. 4 to 7 are front views showing the states of the display device 10 of the charger 1 according to the present invention.

Figure 4:
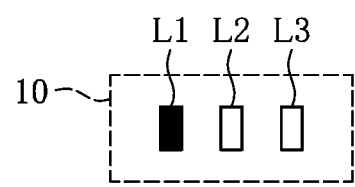
FIG. 4 is a front view showing a state of a display device of the charger according to the present invention.

When the determination result for the power supply capability is Low, which the display device 10 has received from the control device 14, the display device 10 turns on only the indicating lamp L1, and turns off the indicating lamps L2 and L3 (FIG. 4).

Figure 5:
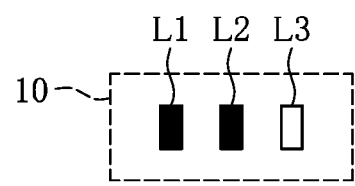
FIG. 5 is a front view showing a state of the display device of the charger according to the present invention.

When the determination result for the power supply capability is Medium, which the display device 10 has received from the control device 14, the display device 10 turns on the indicating lamps L1 and L2, and turns off the indicating lamp L3 (FIG. 5).

Figure 6:
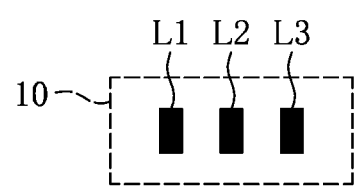
FIG. 6 is a front view showing a state of the display device of the charger according to the present invention.

When the determination result for the power supply capability is High, which the display device 10 has received from the control device 14, the display device 10 turns on all of the indicating lamps L1 to L3 (FIG. 6).

Figure 7:
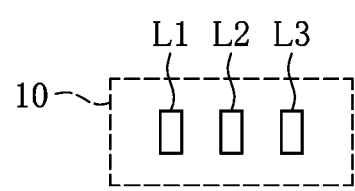
FIG. 7 is a front view showing a state of the display device of the charger according to the present invention.

In a further preferred aspect, when the control device 14 has notified the display device that all of the secondary batteries B1 to B4 are fully charged, the display device 10 turns off all of the indicating lamps L1 to L3 (FIG. 7).

Thus, the charger 1 can display the power supply capability of the external equipment 3, in stages by the display device 10. At this time, correspondence between the power supply capability of the external equipment 3 and the time period required for charging the secondary battery 2 is prepared beforehand, and thereby a user can grasp the maximum charging time period which is spent before the secondary battery 2 is fully charged. In the cases where the power supply capability is each of three stages of Low, Medium and High, the time period required for charging the secondary battery 2 is estimated beforehand. Thereby, for instance, in the cases where the power supply capability is each of Low, Medium and High, it can be estimated which one is the maximum charging time period among approximately 10 hours, 5 hours, and 2 and a half hours, respectively.

Furthermore, the control device 14 determines the power supply capability of the external equipment 3 not only when the external equipment 3 has been connected but also periodically, and thereby can detect the variation of the power supply capability even when the power supply capability has varied during the charge. Thereby, for instance, when the charge is started in a state in which the power supply capability is 5 volts and 1.0 ampere, and when the electric power supply of the external equipment 3 has been lowered to 5 volts and 0.5 amperes by a certain reason, the display of the display device 10 is switched to Low from Medium. In addition, at this time, if a timing at which this display is switched is a time point at which 2 and a half hours has elapsed after the charge has been started, for instance, the maximum charging time period can be corrected to 7 and a half hours, from 5 hours of the initial estimate. For this reason, even when the power supply capability of the external equipment 3 has varied, the user results in being capable of correctly estimating the maximum charging time period required for the charge.

As has been described above, the charger 1 determines the power supply capability of the external equipment 3, and displays the power supply capability on the display device 10. Thereby, the user can estimate the maximum charging time period required for the charge. In addition, the display device 10 includes the plurality of indicating lamps L1 to L3, and accordingly allows a user to easily and intuitively estimate the time period required for the charge; and has a simple structure, and accordingly can lower the cost. Furthermore, even though the full-charge indicating portions L4 to L7 are not provided, the display device 10 can display a sign that the charge has been completed, by turning off all of the plurality of indicating lamps L1 to L3.

Second Embodiment of Present Invention

Next, a second embodiment of the present invention will be described below.

The charger 1 in the present embodiment has common components with those of the charger 1 in the first embodiment, and a part of a method for controlling the inner part is different from that in the first embodiment. The part which is different from that in the first embodiment will be described below. The components which are common with those in the first embodiment will be designated by the same reference numerals, and the detailed description will be omitted below.

In the second embodiment, the control device 14 periodically determines the power supply capability of the external equipment 3, by detecting an electric current and a voltage of an electric power which is supplied to the charging circuit 13 from the external equipment 3. Here, as for the power supply capability through the USB, suppose that the voltage is 5 volts. The power supply capability is determined by three stages of Low, Medium and High, depending on which one is the electric current among 0.5 A, 1.0 A and 2.0 A, respectively.

The control device 14 sets a mode in which the secondary battery 2 is charged by the charging circuit 13, on the basis of the power supply capability, after having determined the power supply capability of the external equipment 3. Specifically, when the determined power supply capability of the external equipment 3 is Low, for instance, the charging mode is set at a mode of Slow Charge. When the determined power supply capability of the external equipment 3 is Medium, for instance, the charging mode is set at a mode of Standard. When the determined power supply capability of the external equipment 3 is High, for instance, the charging mode is set at a mode of Quick Charge. Then, the control device 14 notifies the display device 10 of the set charging mode.

The display device 10 receives the charging mode which the control device 14 has set in the charging circuit 13, and displays the charging mode by the three indicating lamps L1 to L3 as will be described below.

When the charging mode which the display device 10 has received from the control device 14 is the mode of Slow Charge, the display device 10 turns on only the indicating lamp L1, and turns off the indicating lamps L2 and L3 (FIG. 4).

When the charging mode which the display device 10 has received from the control device 14 is the mode of Standard, the display device 10 turns on only the indicating lamps L1 and L2, and turns off the indicating lamp L3 (FIG. 5).

When the charging mode which the display device 10 has received from the control device 14 is the mode of Quick Charge, the display device 10 turns on all of the indicating lamps L1 to L3 (FIG. 6).

In a further preferred aspect, when the control device 14 has notified the display device 10 that all of the secondary batteries B1 to B4 are in a state of being fully charged, the display device 10 turns off all of the indicating lamps L1 to L3 (FIG. 7).

Thus, the charger 1 can display the charging mode which the control device 14 has set in the charging circuit 13, in stages by the display device 10. At this time, correspondence between the charging mode and the time period required for charging the secondary battery 2 is prepared beforehand, and thereby a user can grasp the maximum charging time period which is spent before the secondary battery 2 is fully charged. In each case of the three stages of charging modes of the mode of Slow Charge, the mode of Standard and the mode of Quick Charge, the time period required for charging the secondary battery 2 is estimated beforehand. Thereby, in the cases where the charging mode is each of the mode of Slow Charge, the mode of Standard and the mode of Quick Charge, for instance, it can be estimated which one is the maximum charging time period among approximately 10 hours, 5 hours, and 2 and a half hours, respectively.

As has been described above, the charger 1 determines the power supply capability of the external equipment 3, and sets the charging mode for the secondary battery 2 on the basis of the power supply capability. Then, the charger 1 displays the set charging mode on the display device 10. Thereby, the user can estimate the maximum charging time required for the charge.

Modified Example

The present invention is not limited to the above-described embodiments in particular, but can be modified in various ways in a range of the invention, which is described in claims.

For instance, in the first embodiment, the power supply capability of the external equipment 3 may not be discretely determined as in the method of the three stages, and may also be continuously determined. In addition, the display form of the display device 10 may not be a form displayed by the plurality of indicating lamps L1 to L3, but may be displayed by a liquid crystal display, a level meter or the like, according to a method of determining the power supply capability.

In addition, in the second embodiment, the control device 14 may set the charging mode so as to adjust the number of the secondary batteries 2 which are simultaneously charged, on the basis of the power supply capability of the external equipment 3. Specifically, for instance, the charging modes are defined that are a single charging mode in which the secondary batteries B1 to B4 are sequentially charged one by one in turn, a two parallel charging mode in which the charge of the secondary batteries B3 and B4 is started after the charge of the secondary batteries B1 and B2 has been completed, and a four parallel charging mode in which all of the secondary batteries B1 to B4 are simultaneously charged. Then, the single charging mode, the two parallel charging mode and the four parallel charging mode are set according to which one is the electric current to be supplied to the charging circuit 13 from the external equipment 3, among 0.5 A, 1.0 A and 2.0 A, respectively. Thereby, even when the power supply capability of the external equipment 3 is comparatively low, the secondary battery B1 which is preferentially charged can be used first.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

First Aspect of Present Invention

The first aspect of the present invention is a charger including: a charging circuit which receives an electric power from external equipment and charges a secondary battery; a control device which determines a power supply capability of the external equipment on the basis of the electric power that is supplied to the charging circuit from the external equipment; and a display device that displays the power supply capability of the external equipment, which has been determined by the control device.

The charger receives the electric power from the external equipment and charges the secondary battery; also determines the power supply capability of the external equipment; and further displays the power supply capability on the display device. Thus, a user can know the power supply capability of the external equipment through the display device of the charger. Then, the user can estimate the maximum charging time period required for the charge, on the basis of the power supply capability of the external equipment.

Thereby, the first aspect of the present invention can provide an operation effect of being capable of providing a charger of which the maximum charging time period required for the charge can be estimated by the user.

Second Aspect of Present Invention

The second aspect of the present invention is the charger according to the above-described first aspect of the present invention, wherein the display device displays the power supply capability of the external equipment, in stages by a plurality of indicating lamps.

The second aspect of the present invention can lower the cost of the charger due to the display device having the simple structure. In addition, because the power supply capability of the external equipment is displayed in stages by the plurality of indicating lamps, the user can intuitively grasp the power supply capability of the external equipment. Therefore, according to the second aspect of the present invention, if a user grasps the stage of the power supply capability and the time period required for the charge beforehand, the user can thereby intuitively and instantly grasp the maximum charging time period for the charge.

Third Aspect of Present Invention

The third aspect of the present invention is the charger according to the above-described second aspect of the present invention, further including a state-of-charge detection circuit which detects a state of charge of the secondary battery, wherein the display device turns off all of the plurality of indicating lamps on condition that the secondary battery has been charged to a fully charged state.

The charger detects the state of charge of the secondary battery during the charge, by including the state-of-charge detection circuit. Then, the charger turns off all of the plurality of indicating lamps on condition that the secondary battery has been charged to the fully charged state. Thereby, the charger according to the third aspect of the present invention can notify the user of the fully charged state of the secondary battery by the indicating lamp which displays the power supply capability of the external equipment, even without having a new mechanism provided, in addition to the above-described operation effect according to the second aspect.

Fourth Aspect of Present Invention

The fourth aspect of the present invention is a charger including: a charging circuit which receives an electric power from external equipment and charges a secondary battery; a control device which determines a power supply capability of the external equipment on the basis of the electric power that is supplied to the charging circuit from the external equipment, and sets a charging mode of the secondary battery in the charging circuit on the basis of the determined power supply capability of the external equipment; and a display device that displays the charging mode which has been set by the control device.

The charger receives the electric power from the external equipment and charges the secondary battery; and also determines the power supply capability of the external equipment. In addition, the control device sets the charging mode of the secondary battery on the basis of the determined power supply capability of the external equipment. Then, the display device displays the charging mode which the control device has set. Thus, the user can know the charging mode which has been set on the basis of the power supply capability of the external equipment, through the display device of the charger. For this reason, the user can estimate the maximum charging time period required for the charge, on the basis of the power supply capability of the external equipment.

Fifth Aspect of Present Invention

The fifth aspect of the present invention is the charger according to the above-described fourth aspect of the present invention, wherein the display device displays the charging mode in stages by a plurality of indicating lamps.

The charger according to the fifth aspect of the present invention can lower the cost of the charger due to the display device having the simple structure. In addition, because the charging mode which the control device has set is displayed in stages by the plurality of indicating lamps, the user can intuitively grasp the charging mode. Therefore, according to the fifth aspect of the present invention, if a user grasps the charging mode and the time period required for the charge beforehand, the user can thereby intuitively and instantly grasp the maximum charging time period for the charge.

Sixth Aspect of Present Invention

The sixth aspect of the present invention is the charger according to the above-described fifth aspect of the present invention, further including a state-of-charge detection circuit which detects a state of charge of the secondary battery, wherein the display device turns off all of the plurality of indicating lamps on condition that the secondary battery has been charged to a fully charged state.

The charger detects the state of charge of the secondary battery during the charge, by including the state-of-charge detection circuit. Then, the charger turns off all of the plurality of indicating lamps on condition that the secondary battery has been charged to the fully charged state. Thereby, the charger according to the sixth aspect of the present invention can notify a user of the fully charged state of the secondary battery by the indicating lamp which displays the charging mode of the charger, even without having a new mechanism provided, in addition to the previously described operation effect according to the fifth aspect.

Seventh Aspect of Present Invention>

The seventh aspect of the present invention is the charger according to any one of the above-described first to sixth aspects of the present invention, wherein the control device periodically determines the power supply capability of the external equipment.

According to the seventh aspect of the present invention, the control device periodically determines the power supply capability of the external equipment, and accordingly can detect the variation of the power supply capability, even when the power supply capability of the external equipment has varied during the charge. For this reason, even when the power supply capability of the external equipment has varied, the user can correctly estimate the maximum charging time period required for the charge.

What is claimed is:

1. A charger comprising:
   a charging circuit which receives an electric power from external equipment and charges a secondary battery;
   a control device which determines a power supply capability of the external equipment to be one of a plurality of grades of power supply capability on the basis of the electric power that is supplied to the charging circuit from the external equipment, the plurality of grades including low, medium, and high; and
   a display device that displays the determined grade of the power supply capability of the external equipment, which has been determined by the control device.

2. The charger according to claim 1, wherein the display device displays the grade of the power supply capability of the external equipment, in stages by a plurality of indicating lamps.

3. The charger according to claim 2, further comprising a state-of-charge detection circuit which detects a state of charge of the secondary battery, wherein
   the display device turns off all of the plurality of indicating lamps on condition that the secondary battery has been charged to a fully charged state.

4. A charger comprising:
   a charging circuit which receives an electric power from external equipment and charges a secondary battery;
   a control device which determines a power supply capability of the external equipment to be one of a plurality of grades of power supply capability on the basis of the electric power that is supplied to the charging circuit from the external equipment, and sets a charging mode of the secondary battery in the charging circuit on the basis of the determined grade of power supply capability of the external equipment, the plurality of grades including low, medium, and high; and
   a display device that displays the charging mode which has been set by the control device.

5. The charger according to claim 4, wherein the display device displays the charging mode in stages by a plurality of indicating lamps.

6. The charger according to claim 5, further comprising a state-of-charge detection circuit which detects a state of charge of the secondary battery, wherein
   the display device turns off all of the plurality of indicating lamps on condition that the secondary battery has been charged to a fully charged state.

7. The charger according to claim 1, wherein the control device periodically determines the grade of power supply capability of the external equipment.

* * * * *